US011325481B2

United States Patent
Collins

(10) Patent No.: US 11,325,481 B2
(45) Date of Patent: May 10, 2022

(54) COVER ASSEMBLY FOR SERVICE PLUG SOCKET

(71) Applicant: Toyota Motor Engineering & Manufacturing North America, Inc., Plano, TX (US)

(72) Inventor: Jeff M. Collins, Davisburg, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 379 days.

(21) Appl. No.: 16/601,872

(22) Filed: Oct. 15, 2019

(65) Prior Publication Data
US 2021/0107364 A1 Apr. 15, 2021

(51) Int. Cl.
*B60L 50/64* (2019.01)
*E05B 65/00* (2006.01)
*B60L 53/16* (2019.01)

(52) U.S. Cl.
CPC .......... *B60L 50/64* (2019.02); *B60L 53/16* (2019.02); *E05B 65/006* (2013.01)

(58) Field of Classification Search
None
See application file for complete search history.

(56) References Cited

U.S. PATENT DOCUMENTS

| 5,934,918 | A | * | 8/1999 | Wuechner | B60L 53/11 439/133 |
|---|---|---|---|---|---|
| 10,060,159 | B2 | | 8/2018 | Fujii | |
| 2013/0271079 | A1 | * | 10/2013 | Tanneberger | B60L 53/00 320/109 |
| 2014/0057468 | A1 | * | 2/2014 | Temmesfeld | H01R 13/6397 439/133 |
| 2014/0187071 | A1 | * | 7/2014 | Rule-Greet | B60L 53/16 439/304 |
| 2014/0326524 | A1 | | 11/2014 | Ogushi et al. | |
| 2016/0176445 | A1 | | 6/2016 | Ito et al. | |
| 2017/0047681 | A1 | | 2/2017 | Yeon | |
| 2018/0205058 | A1 | | 7/2018 | Lee et al. | |

* cited by examiner

*Primary Examiner* — Jared Fureman
*Assistant Examiner* — Joel Barnett
(74) *Attorney, Agent, or Firm* — Christopher G. Darrow; Darrow Mustafa PC

(57) ABSTRACT

Discloses embodiments disclosed relate to a cover assembly adapted to be mounted on a service plug socket of a high voltage battery. The assembly includes a brace member including a nesting feature to engage the service plug socket and a first opening for receiving a locking device, and a clamping member, slidably attached to the brace member to move between an open position and a closed position, the clamping member including a second opening for receiving the locking device. The clamping member and the brace member define a cavity, configured to receive the service plug socket, that reduces in size as the clamping member slides from the open position to the closed position. When the service plug socket is inserted in the cavity and the cover assembly is closed, the nesting feature engages with the service plug socket to prevent separation of the cover assembly from the service plug socket.

8 Claims, 5 Drawing Sheets

COVER ASSEMBLY FOR SERVICE PLUG SOCKET

TECHNICAL FIELD

The subject matter described herein relates generally to automotive accessories and, in particular to a lockable cover assembly for preventing activation of a service plug of a high voltage battery in a vehicle.

BACKGROUND

Vehicles that draw power from one or more high voltage batteries often include a mechanism to disable the battery while the vehicle is being serviced by a mechanic or technician to prevent injury to the mechanic. For example, high voltage batteries in many electric vehicles can be disengaged by removing a service plug grip from a service plug socket. However, a technician may remove the service plug grip before working on the vehicle (i.e., deactivating the battery), yet still remain at risk of serious injury if someone else reinserts the service plug grip without the technician being aware (e.g., while the technician has stepped away from the vehicle).

SUMMARY

Embodiments described herein disclose a lockable cover assembly designed to prevent insertion of a service plug grip, e.g., by a third party, while service personnel is unaware.

For example, in one embodiment a cover assembly adapted to be mounted on a service plug socket of a high voltage battery includes a brace member, including a nesting feature to engage the service plug socket and a first opening for receiving a locking device, and a clamping member, slidably attached to the brace member to move between an open position and a closed position, the clamping member further including a second opening for receiving the locking device. The clamping member and the brace member can define a cavity, configured to receive the service plug socket. The cavity reduces in size as the clamping member slides from the open position to the closed position. When the service plug socket is inserted in the cavity and the cover assembly is in the closed position, the nesting feature engages with the service plug socket to prevent separation of the cover assembly from the service plug socket.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

This detailed description relates to lockable cover assemblies for preventing reinsertion of a service plug grip into a service plug socket of a high voltage battery. Detailed embodiments are disclosed herein, however, it is to be understood that the disclosed embodiments are intended only as examples. Specific structural and functional details disclosed herein are not to be interpreted as limiting, but merely as a basis for the claims and as a representative basis for teaching one skilled in the art to variously employ the features described herein in virtually any appropriately detailed structure. Further, the terms and phrases used herein are not intended to be limiting but rather to provide an understandable description of possible implementations.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
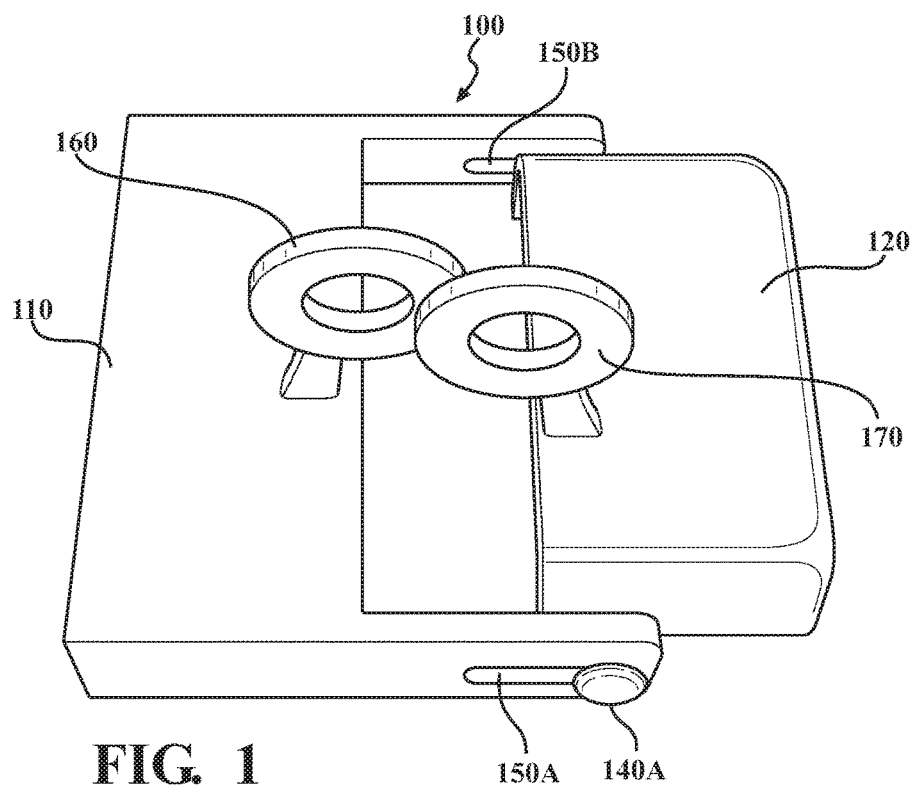
FIG. 1 illustrates a perspective view of a cover assembly according to the disclosed subject matter.

In order to protect a service worker from injury while working on a device connected to a high voltage battery, a lockable cover assembly is disclosed. FIG. 1 shows a top perspective view of a cover assembly 100 in an open position according to the disclosed embodiments. The cover assembly includes a brace member 110, and a clamping member 120 slidably attached to the brace member 110.

The brace member 110 can include a pair of extended slots on opposite sides of the brace member 110. For example, an extended slot 150A is shown on the forward-facing side of the brace member 110, and a corresponding slot 150B can be included on the opposing side of the brace member 110. The brace member 110 can further include an opening 160 for receiving a locking device (not shown). For example, the opening 160 can be configured as a fixed loop, as shown, or another type of opening suitable for receiving a locking device in the manner described further below.

The clamping member 120 can include a plurality of fasteners that pass through the extended slots and attach the clamping member 120 to the brace member 110. For example, a fastener 140A is shown on the forward-facing side of the clamping member 120, and a corresponding fastener (not shown) can be included on the opposing side of the clamping member 120. In one or more embodiments the fasteners can be implanted as, for example, screws, bolts, cylindrical rods or other types of components suitable for passing through the extended slots. In one or more embodiments, the fasteners permit at least a degree of rotation of the clamping member 120 around an axis that passes through the fasteners. The clamping member 120 can further include an opening 170 for receiving a locking device. The opening 170 can be configured, for example, as a fixed loop or another type of opening suitable for receiving a locking device.

Figure 2:
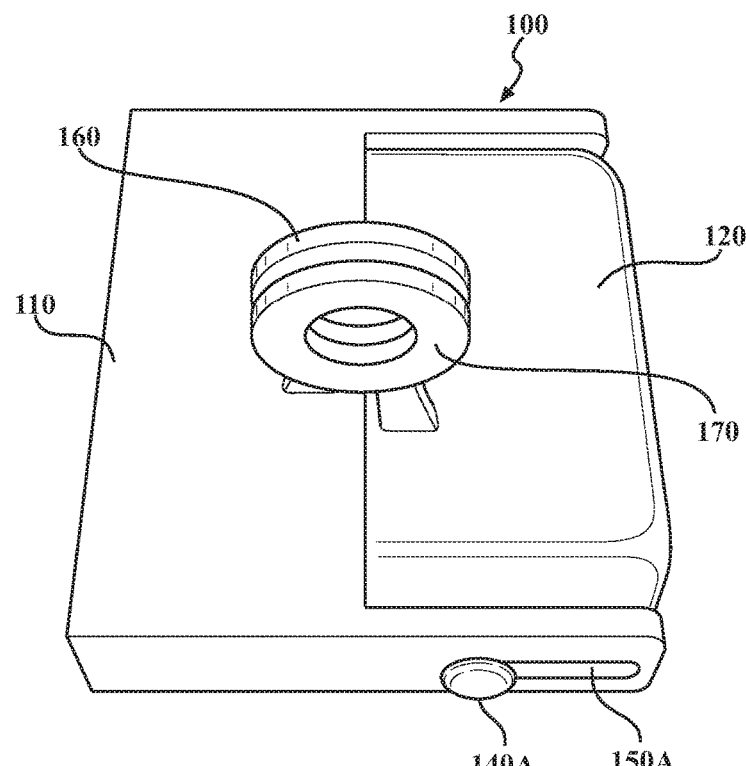
FIG. 2 illustrates a cover assembly in a closed position according to the disclosed embodiments.

FIG. 2 shows the cover assembly 100 in a closed position according to the disclosed embodiments. In the closed position, the opening 170 of the clamping member 120 is aligned with the opening 160 of the brace member 110 such that a locking device (not shown) can pass through both openings 160, 170 and thereby prevent a transition of the cover assembly 100 from the closed position to the open position.

Figure 3:
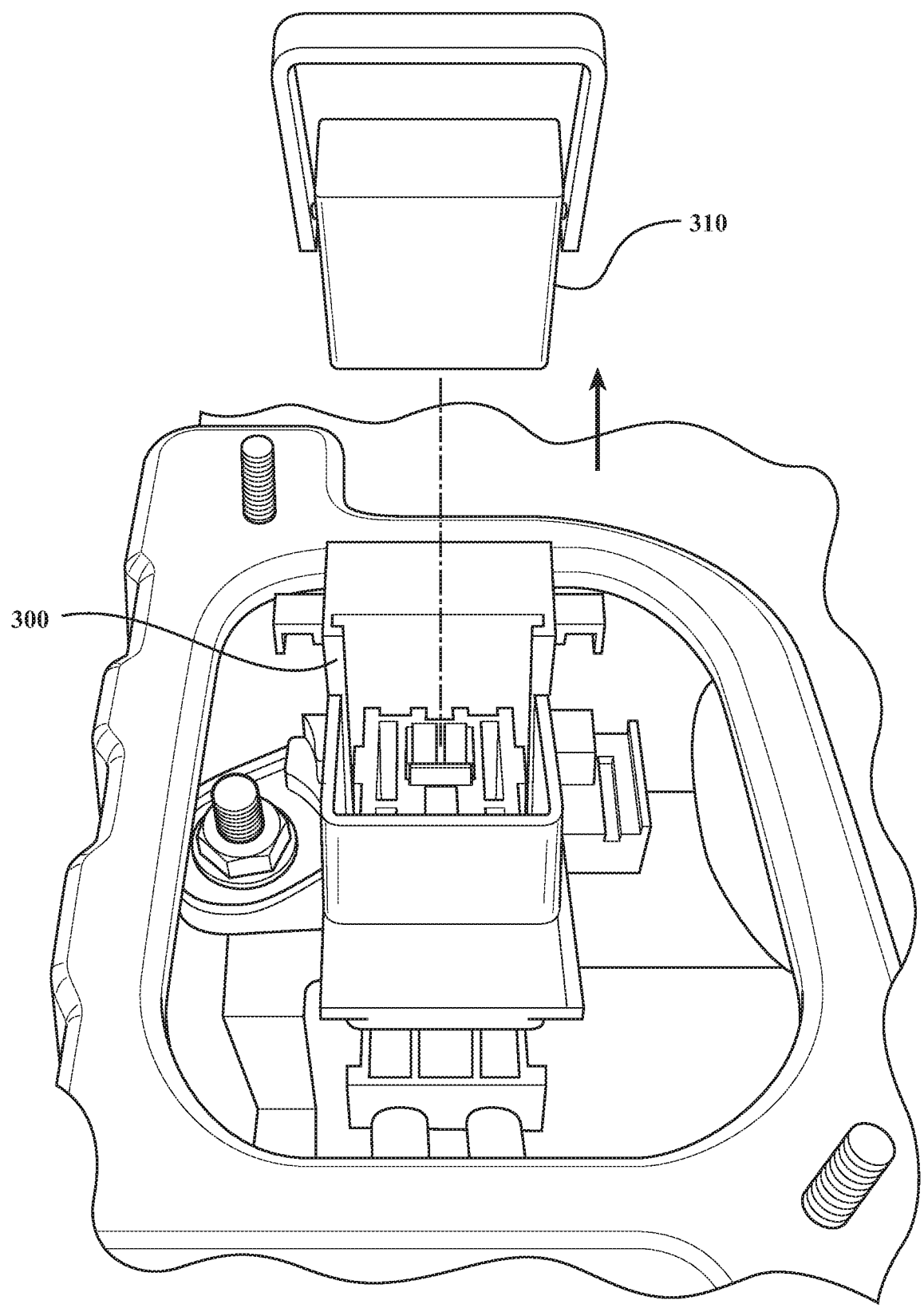
FIG. 3 illustrates a frontal view of an example service plug socket.

FIG. 3 shows a frontal view of an example service plug socket 300 of a high voltage battery (not shown) and a service plug grip 310. The high voltage battery may power a load, for example, an engine of a hybrid or electric vehicle. It should be understood that the service plug socket 300 and the service plug grip 310 are merely illustrative examples. The disclosed embodiments are applicable to different types of service plug sockets of different shapes and sizes. The service plug grip 310 is illustrated being removed from the service plug socket 300. While the service plug grip 310 is removed, the high voltage battery is disengaged from powering the load.

Figure 4:
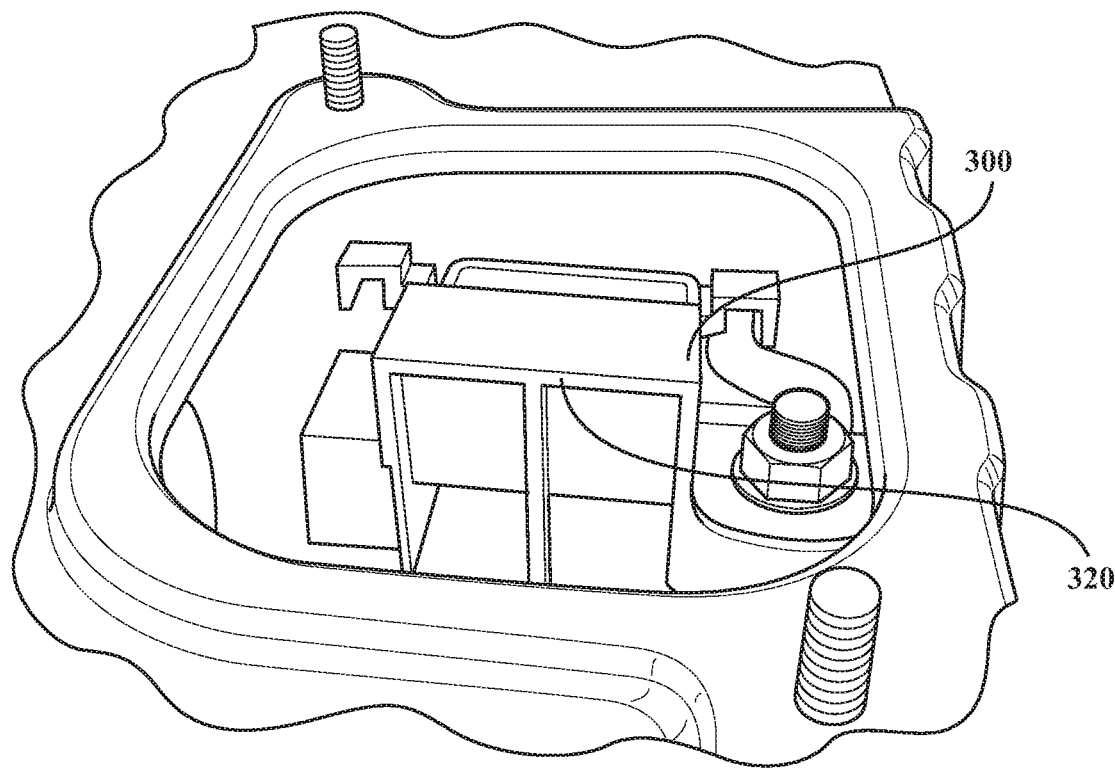
FIG. 4 illustrates a rear view of the service plug socket.

FIG. 4 shows a rear view of the service plug socket 300. The service plug socket 300 includes edge protrusions 320 upon which the cover assembly 100 can attach, as will be described below. It should be understood that the edge protrusions 320 as drawn are merely an example provided for illustrative purposes. The size and shape of edge protrusions 320 of a service plug socket 300 can vary per model.

Figure 5:
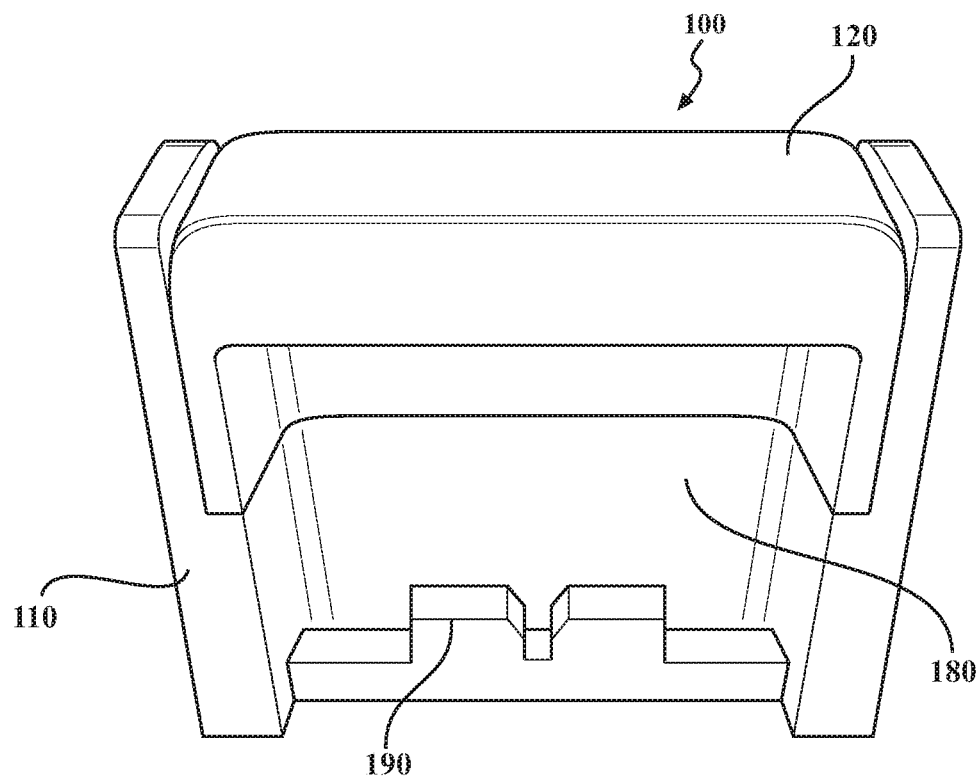
FIG. 5 illustrates a lower perspective view of the cover assembly in a closed position according to the disclosed subject matter.

FIG. 5 shows a lower perspective view of the cover assembly 100 in a closed position. As shown, in one or more embodiments the brace member 110 includes a nesting feature 190 designed to engage the edge protrusions 320 of the service plug socket 300. The nesting feature 190 can be implemented, for example, as one or more protrusions having a size and/or shape to engage an edge protrusion 320 of a service plug socket 300 for a given vehicle model. That is, the nesting feature 190 can be customized according to the design of the service plug socket 300 for various vehicle models. Furthermore, in one or more embodiments the nesting feature 190 can be included in the clamping member 120 instead of the brace member 110. In one or more embodiments both the clamping member 120 and the brace member 110 can include a nesting feature 190.

Also as shown, in one or more embodiments the brace member 110 is constructed having a shape that forms a portion of an inner cavity 180 of the cover assembly 100, with the clamping member 120 being constructed having a shape that forms another portion of the inner cavity 180. The inner cavity 180 can be substantially similar in size and shape to an outer contour of the service plug socket 300 such that in a closed position the inner walls of the cavity 180 are in contact with or nearly in contact with the service plug socket 300. It should be understood that while the inner cavity 180 is shown having a rectangular shape, the exact shape of the inner cavity 180 can be adjusted per implementation according to the service plug socket 300.

Figure 6:
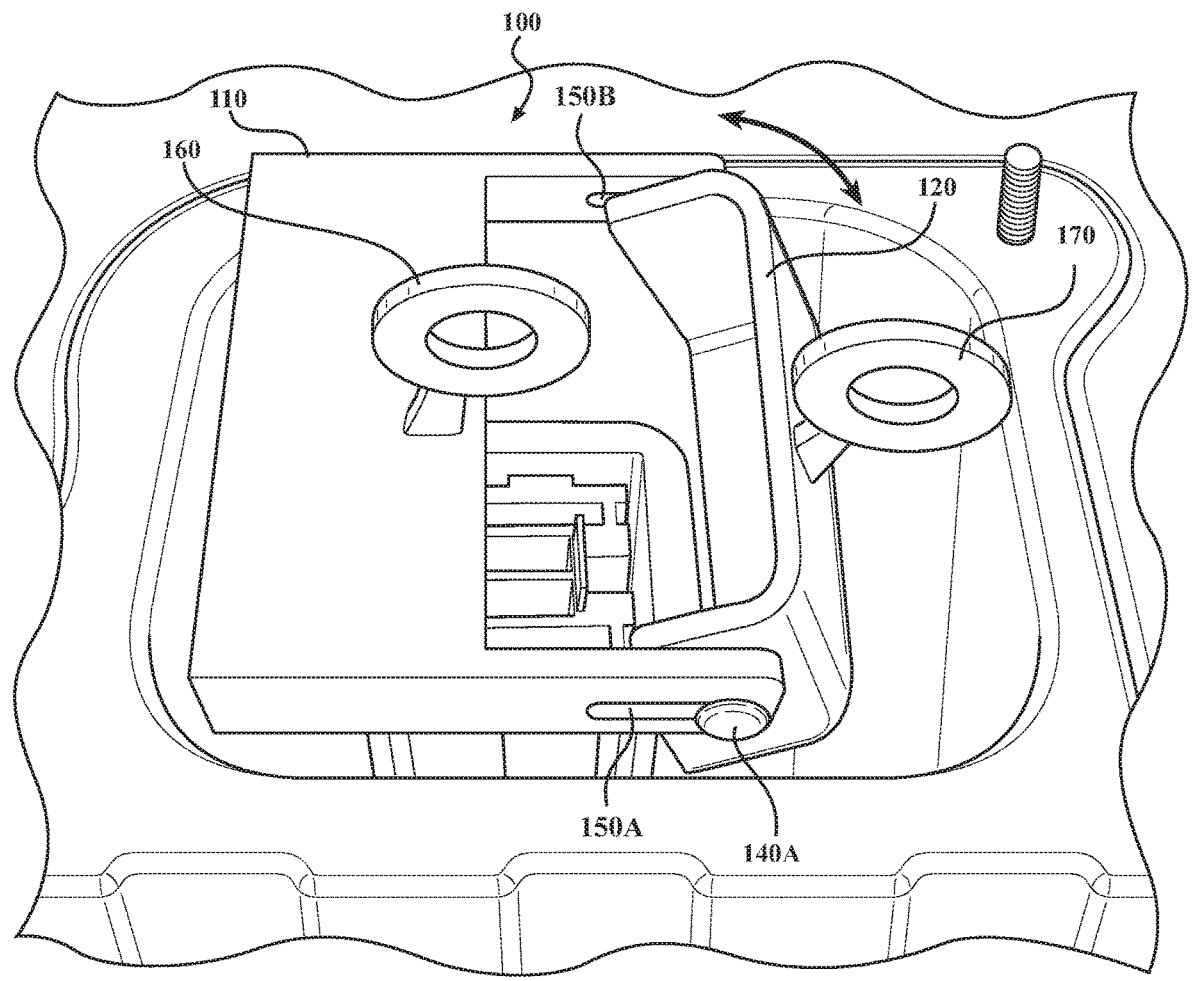
FIG. 6 illustrates a cover assembly in an open position mounted on the service plug socket according to the disclosed subject matter.

FIG. 6 shows the cover assembly 100 in an open position mounted on the service plug socket 300. Recall that in the open position the clamping member 120 is slid away from the brace member 110, i.e., along the extended slots. Furthermore, in one or more embodiments the clamping member 120 may be rotated in a direction away from the brace member 110, e.g., to further facilitate the mounting process, as shown by the arrow.

To be mounted, the open cover assembly 100 is placed in position to cover the service plug socket 300, i.e., by inserting the service plug socket 300 into the inner cavity (not visible) of the open cover assembly 100. The brace member 110 is then slid toward the service plug socket 300 such that the nesting feature (not visible) of the bracing member 110 engages with the edge protrusions (not visible) of the service plug socket 300. This engagement, in combination with the inner cavity surrounding a portion of the service plug socket 300, prevents the cover assembly 100 from being removed from the service plug socket 300 except by sliding the cover assembly 100 back away from service plug socket 300 to disengage the nesting features. At this point the opening 160 of the brace member 110 and the opening 170 of the clamping member 120 are not in alignment.

Figure 7:
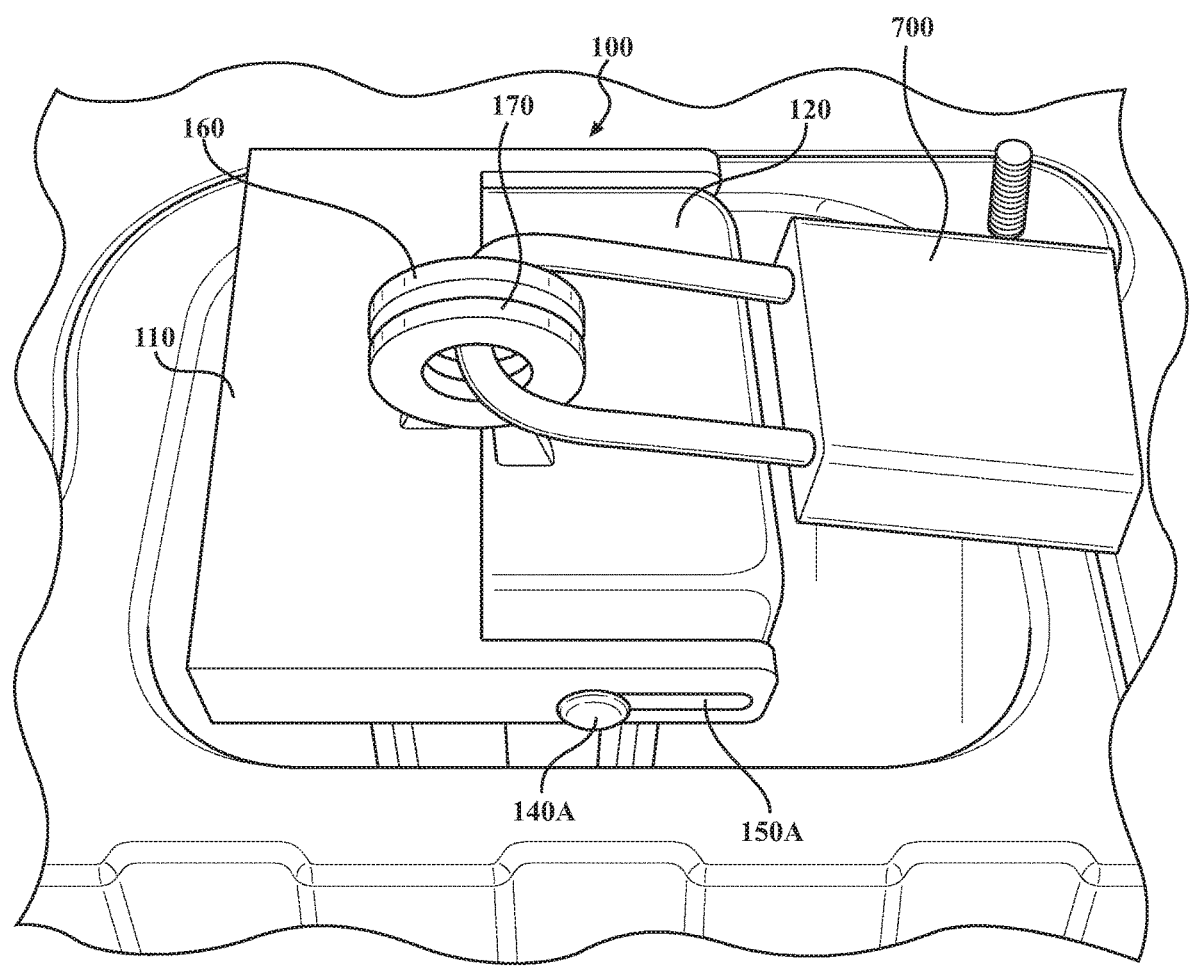
FIG. 7 illustrates a cover assembly in a closed and locked position mounted on a service plug according to the disclosed subject matter.

FIG. 7 shows cover assembly 100 in a closed and locked position mounted on the service plug socket 300. The clamping member 120 has been rotated toward the brace member 110 and slid in a direction toward the brace member 110, thereby reducing the size of the inner cavity 180 and consequently restricting lateral movement of the cover assembly 100 upon the service plug socket 300. Whereas in the open position shown in FIG. 6 the brace member 110 could be slid laterally to disengage the nesting features from the edge protrusions of the service plug socket 300, such lateral movement is restricted in the closed position by the enclosure of the inner cavity 180 around the service plug socket 300. Also, in the closed position, the opening 160 of the brace member 110 and the opening 170 of the clamping member are aligned.

In order to securely maintain the closed position, a locking device 700, e.g., a padlock or another type of lock, is passed through the aligned openings 160 and 170. Thus, the closed, locked cover assembly 100 prevents any unannounced or accidental reinsertion of the service plug grip into the service plug socket 300. A technician servicing a hybrid or electric vehicle can mount and lock the disclosed cover assembly 100 and be protected from a third party creating a dangerous situation by activating the high voltage battery without notifying the technician.

Aspects herein can be embodied in other forms without departing from the spirit or essential attributes thereof. Accordingly, reference should be made to the following claims, rather than to the foregoing specification, as indicating the scope hereof.

What is claimed is:

1. A cover assembly adapted to be mounted on a service plug socket of a high voltage battery, comprising:
   a brace member, including a nesting feature configured to engage the service plug socket and a first opening for receiving a locking device; and
   a clamping member, slidably attached to the brace member to move between an open position and a closed position, the clamping member further including a second opening for receiving the locking device,
   wherein the clamping member and the brace member define a cavity configured to receive the service plug socket and that reduces in size as the clamping member slides from the open position to the closed position, and
   wherein, when the service plug socket is inserted in the cavity and the cover assembly is in the closed position, the nesting feature engages with the service plug socket to prevent separation of the cover assembly from the service plug socket.

2. The cover assembly of claim 1, wherein in the closed position the first opening for receiving the locking device on the brace member is aligned with the second opening for receiving the locking device on the clamping member.

3. The cover assembly of claim 2, further comprising a lock device configured to pass through the first opening and the second opening, thereby preventing the cover assembly from transitioning from the closed position to the open position.

4. The cover assembly of claim 1, wherein the brace member includes a pair of extended slots on opposite sides of the brace member, and the clamping member is slidably attached to the brace member by a pair of fasteners on opposite sides of the clamping member that pass through the pair of extended slots, thereby allowing the clamping member to slide between the open position and the closed position.

5. The cover assembly of claim 4, where the pair of fasteners are cylindrical and allow the clamping member to rotate around an axis which passes through the pair of fasteners.

6. The cover assembly of claim 1, wherein the nesting feature is a protrusion adapted to engage an edge feature of the service plug socket.

7. The cover assembly of claim 1, wherein the clamping member includes a second nesting feature adapted to engage an edge feature of the service plug socket.

8. The cover assembly of claim 1, wherein the high voltage battery is configured to power a hybrid or electric vehicle.

* * * * *